(12) United States Patent
Gowda et al.

(10) Patent No.: US 6,628,333 B1
(45) Date of Patent: Sep. 30, 2003

(54) DIGITAL INSTANT CAMERA HAVING A PRINTER

(75) Inventors: Sudhir Muniswamy Gowda, Ossining, NY (US); Mary Yvonne Lanzerotti, Carmel, NY (US); Dale Jonathan Pearson, Yorktown Heights, NY (US); Hon-Sum Philip Wong, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/967,853

(22) Filed: Nov. 12, 1997

(51) Int. Cl.⁷ .................. H04N 5/222; H04N 5/225
(52) U.S. Cl. ............... 348/333.11; 348/207.2; 348/333.07; 348/375; 348/376
(58) Field of Search .................. 348/61, 64, 207, 348/222, 231–233, 239, 240, 333.01, 333.02, 333.05, 333.06, 333.07, 333.11, 333.12, 373–376, 552, 222.01; 358/296, 302, 501–503, 906, 909.1; 386/95, 107–109, 112, 117, 118; 396/310, 319–321, 373, 374, 429; H04N 5/222, 5/225

(56) References Cited

U.S. PATENT DOCUMENTS

| | | | |
|---|---|---|---|
| 4,318,597 A | 3/1982 | Kotani et al. | |
| 4,467,949 A | 8/1984 | Nakata | |
| 4,605,944 A | 8/1986 | Ishii et al. | |
| 4,689,694 A | 8/1987 | Yoshida | |
| 4,780,730 A | 10/1988 | Dodge et al. | |
| 4,827,347 A | * 5/1989 | Bell | 348/333.05 |
| 4,835,549 A | 5/1989 | Samejima et al. | |
| 4,896,168 A | 1/1990 | Newman et al. | |
| 4,937,676 A | * 6/1990 | Finelli | 348/375 |
| 4,967,192 A | 10/1990 | Hirane et al. | |
| 5,040,003 A | 8/1991 | Willis | |
| 5,105,202 A | 4/1992 | Hewes | |
| 5,121,131 A | 6/1992 | Bouldin et al. | |
| 5,134,340 A | 7/1992 | Haitz | |
| D329,862 S | 9/1992 | Watanabe et al. | |
| 5,258,629 A | 11/1993 | Itoh et al. | |
| 5,365,562 A | 11/1994 | Toker | |
| 5,442,512 A | 8/1995 | Bradbury | |
| 5,471,265 A | 11/1995 | Shibata et al. | |
| 5,488,558 A | * 1/1996 | Ohki | 701/207 |
| 5,550,391 A | 8/1996 | Yamaguchi | |
| D377,034 S | 12/1996 | Matsushita | |

(List continued on next page.)

OTHER PUBLICATIONS

Paul Suni, "Advanced design creating single–chip vision systems", Laser Focus World, pp. 73–83, Apr. 1997.
Elizabeth M. Lockyer, "Applications Hold The Key to Imager Choice", Photonics Spectra, pp. 80–90, Mar. 1997.
"RDC–2 Digital Still+Sound Pkg. #2", The Internet, http://digitaleye.buysafe.com/browse.asp?g=19790&c=19801, Aug. 6, 1997.

Primary Examiner—Ngoc-Yen Vu
(74) Attorney, Agent, or Firm—F Chau & Associates, LLP

(57) ABSTRACT

In an illustrative embodiment, an instant camera is provided which includes an imager for receiving an image of an object to be photographed. The imager outputs a signal corresponding to the received image, and a memory device stores the signal. A printer prints instant film photographs corresponding to received or stored images, and has the capability to print at least one image on a single piece of instant film. A preview unit has at least one display for displaying an image corresponding to a received or stored image. A controller, in communication with the imager, the memory device, the printer, and the preview unit, controls the transfer of the signal from the imager to the memory device, from the memory device to the printer, and from the memory device to the preview unit.

34 Claims, 8 Drawing Sheets

U.S. PATENT DOCUMENTS

| | | | | |
|---|---|---|---|---|
| 5,587,740 A | | 12/1996 | Brennan | |
| 5,802,413 A | * | 9/1998 | Stephenson | 396/429 |
| 5,847,836 A | * | 12/1998 | Suzuki | 358/296 |
| 5,894,326 A | * | 4/1999 | McIntyre | 348/333.06 |
| 6,094,282 A | * | 7/2000 | Hoda | 358/909.1 |
| 6,102,505 A | * | 8/2000 | McIntyre | 347/2 |
| 6,147,703 A | * | 11/2000 | Miller | 348/220.1 |
| 6,188,432 B1 | * | 2/2001 | Ejima | 348/240 |
| 6,229,565 B1 | * | 5/2001 | Bobry | 348/207 |
| 6,313,877 B1 | * | 11/2001 | Anderson | 348/333.05 |

* cited by examiner

DIGITAL INSTANT CAMERA HAVING A PRINTER

BACKGROUND OF THE INVENTION

1. Field of the Invention

The present invention relates to instant cameras. More specifically, it relates to an instant camera that can provide an arbitrary number of high-quality, instant photographs of a stored digital image.

2. Description of the Prior Art

People often wish to have instant, high-quality photographs to give to their friends and relatives as mementos or souvenirs. Instant photographs provide immediate feedback about the people and the event that is being photographed.

However, there are numerous deficiencies present in existing instant cameras. For example, existing instant cameras are not capable of providing the user with multiple instant photographs of the same image, nor do they allow the user to preview a potential photograph before the photograph is taken on instant film. Other deficiencies with instant cameras include: the inability to compare the photograph with previous photographs; the lack of a permanent record of the instant photograph (i.e., such as in a digital format for downloading to a personal computer); and, the inability to zoom in on a desired area of an image at full resolution for preview before printing the image on instant film.

Digital cameras can provide the capability to store photographed digital images, as well as the capability to subsequently download stored digital images to external devices such as computers. Furthermore, digital cameras allow the user to preview a potential photograph through a monitor or viewfinder prior to taking the picture. However, existing digital cameras are not capable of providing instant photographs.

The present invention combines the advantages of a digital camera with the ability to provide instant photographs. This combination allows an arbitrary number of copies of the same photographic image to be printed from the camera, in the case in which more than one copy is desired.

SUMMARY OF THE INVENTION

Therefore, it is an object of the present invention to provide a digital instant camera that is capable of printing instant photographs.

Another object of the present invention is to allow the user to preview a potential photograph before the photograph is taken on instant film.

Yet another object of the present invention is to allow the user to compare an image with previously stored images.

In an illustrative embodiment, the instant camera includes an imager for receiving an image of an object to be photographed. The imager outputs a signal corresponding to the received image, and a memory device stores the signal. A printer prints instant film photographs corresponding to received or stored images, and has the capability to print at least one image on a single piece of instant film. A preview unit has at least one display for displaying an image corresponding to a received or stored image. A controller, in communication with the imager, the memory device, the printer, and the preview unit, controls the transfer of the signal from the imager to the memory device, from the memory device to the printer, and from the memory device to the preview unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF PREFERRED EMBODIMENTS

Figure 1:
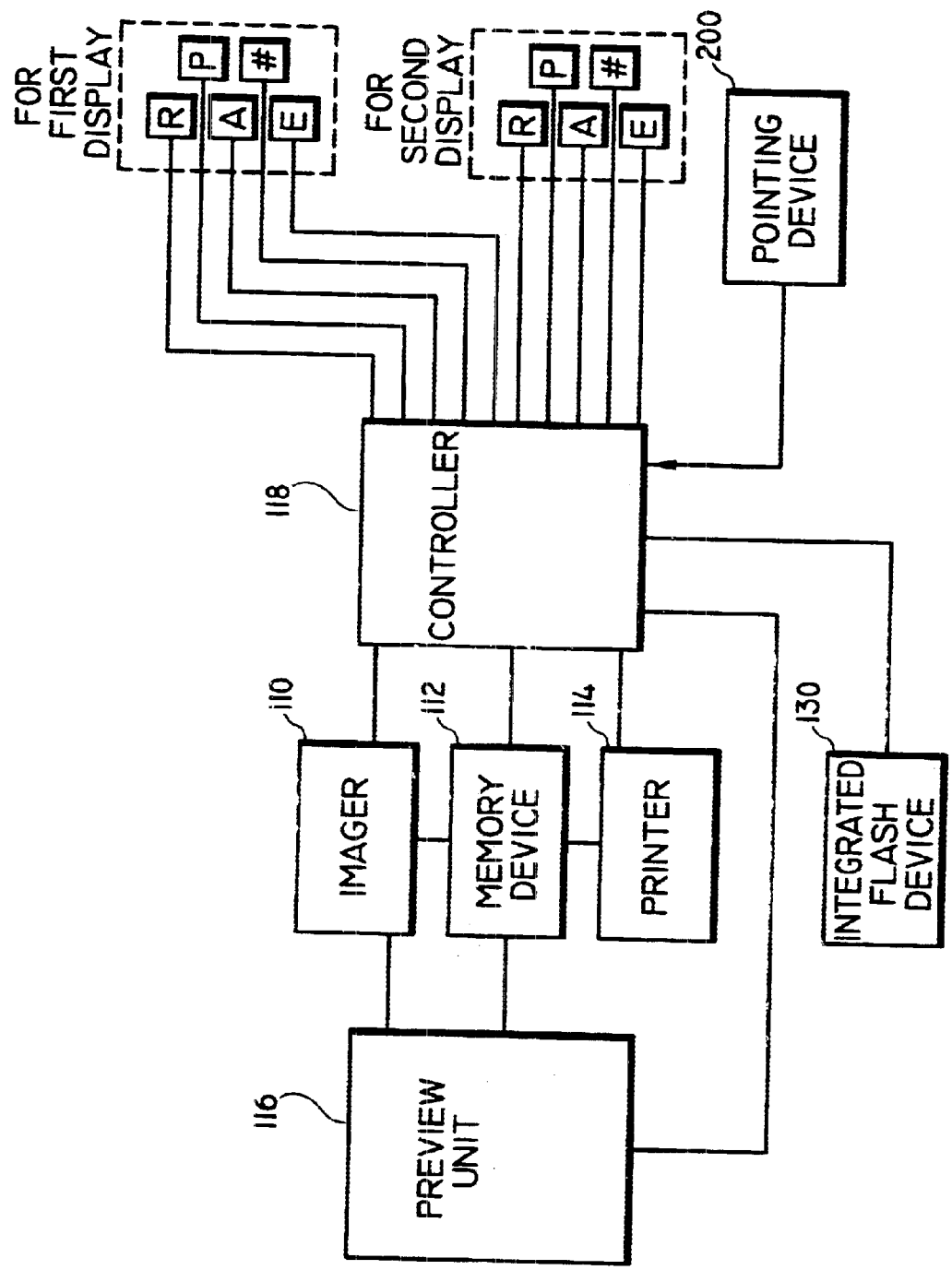
FIG. 1 is a block diagram of a digital instant camera according to an embodiment of the invention.

Referring to FIG. 1, the digital instant camera 100 includes an imager 110 which receives an image of an object to be photographed and outputs a signal corresponding to the received image. A memory device 112 stores the signal. A printer 114 prints instant film photographs corresponding to received or stored digital images, and has the capability to print at least one image on a single piece of instant film. A preview unit 116 has at least one display for displaying an image corresponding to a received or stored image. A controller 118, in communication with the imager 110, the memory device 112, the printer 114, and the preview unit 116, controls the transfer of the signal from the imager 110 to the memory device 112, from the memory device 112 to the printer 114, and from the memory device 112 to the preview unit 116.

According to the illustrative embodiment of FIG. 1, the controller 118 is a microprocessor of any suitable known type and the imager 110 is a digital imager. Imager 110 can be, for example, a charged-coupled device (CCD), a complementary metal-oxide semiconductor (CMOS), a charge-injection device (CID), or a hybrid of the aforementioned.

Figure 2:
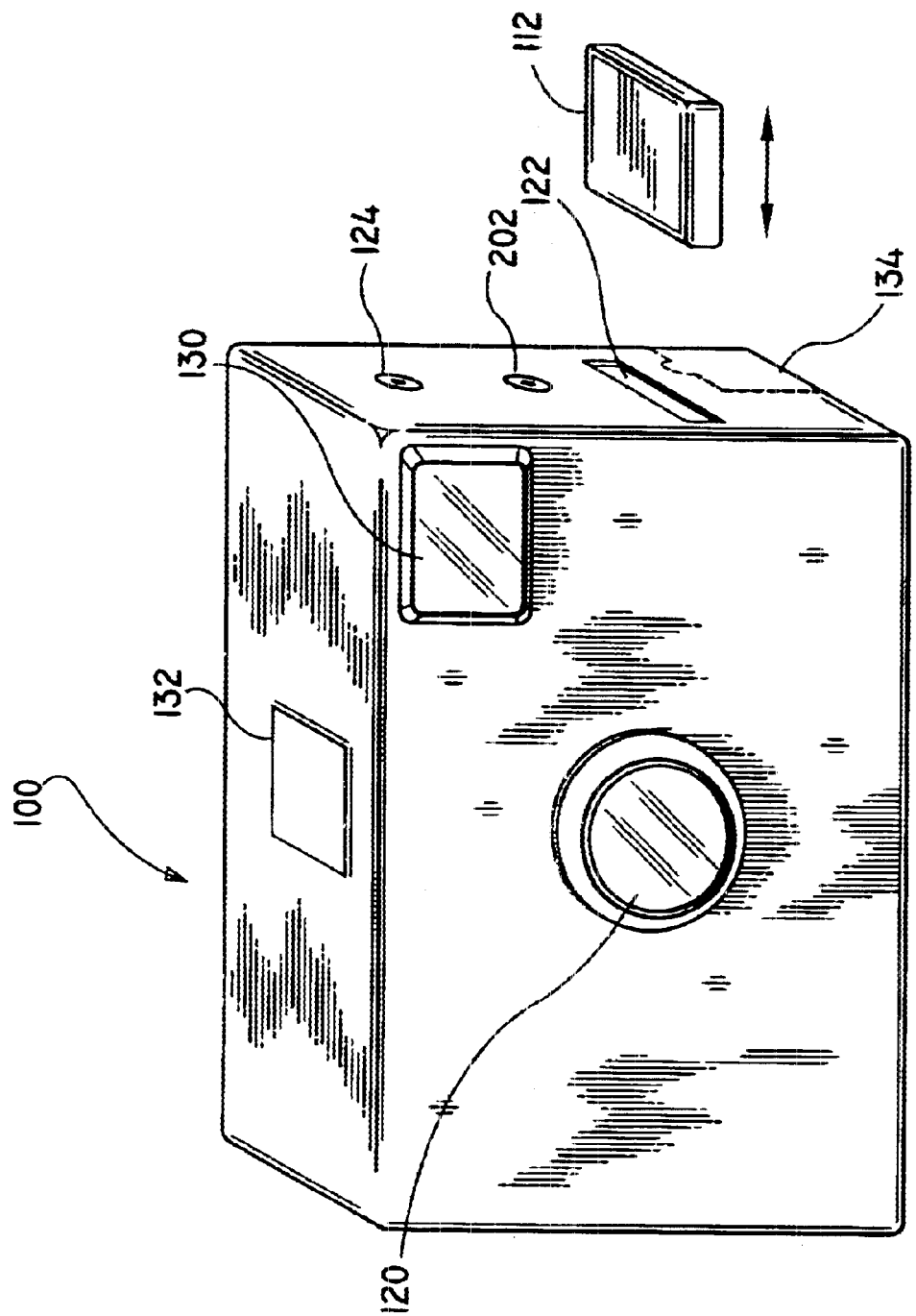
FIG. 2 is a front view of a digital instant camera according to an embodiment of the invention.

FIG. 2 shows the front side of a preferred embodiment of the digital instant camera. The standard optics 120 include a lens, shutter, and aperture, and focus the light onto the imaging device 110. As shown in FIG. 2, memory device 112 is removable. In this embodiment, the digital instant camera includes a memory interface 122 for interfacing with a removable memory device. The memory interface 122 is a PCMCIA adapter and the memory device 112 is a standard PCMCIA memory card. Alternatively, memory device 112 can be formed from any of a number of different types of memory technologies, for example, flash memory, disk, dynamic random access memory (DRAM), static random access memory (SRAM), magnetic disk, magnetic tape, and optical memory. Such other memory devices may be removable or integrated into the camera.

Additionally, memory device 112 may be omitted. In such a case, the controller 118 would control the transfer of a received image from the imager 110 to the printer 114, and from the imager 110 to the preview unit 116. However, if the preview unit 116 is also omitted, then the controller 118 would simply control the transfer of the signal from the imager 110 to the printer 114.

A downloading means 124 such as, for example, a connection port is provided for downloading stored images from the memory device 112 to an external device such as a computer. Such downloading means 124 may simply be a video output jack or more sophisticated means for transmitting stored information such as, for example, wireless, infrared, and fiberoptic technologies.

Figure 3:
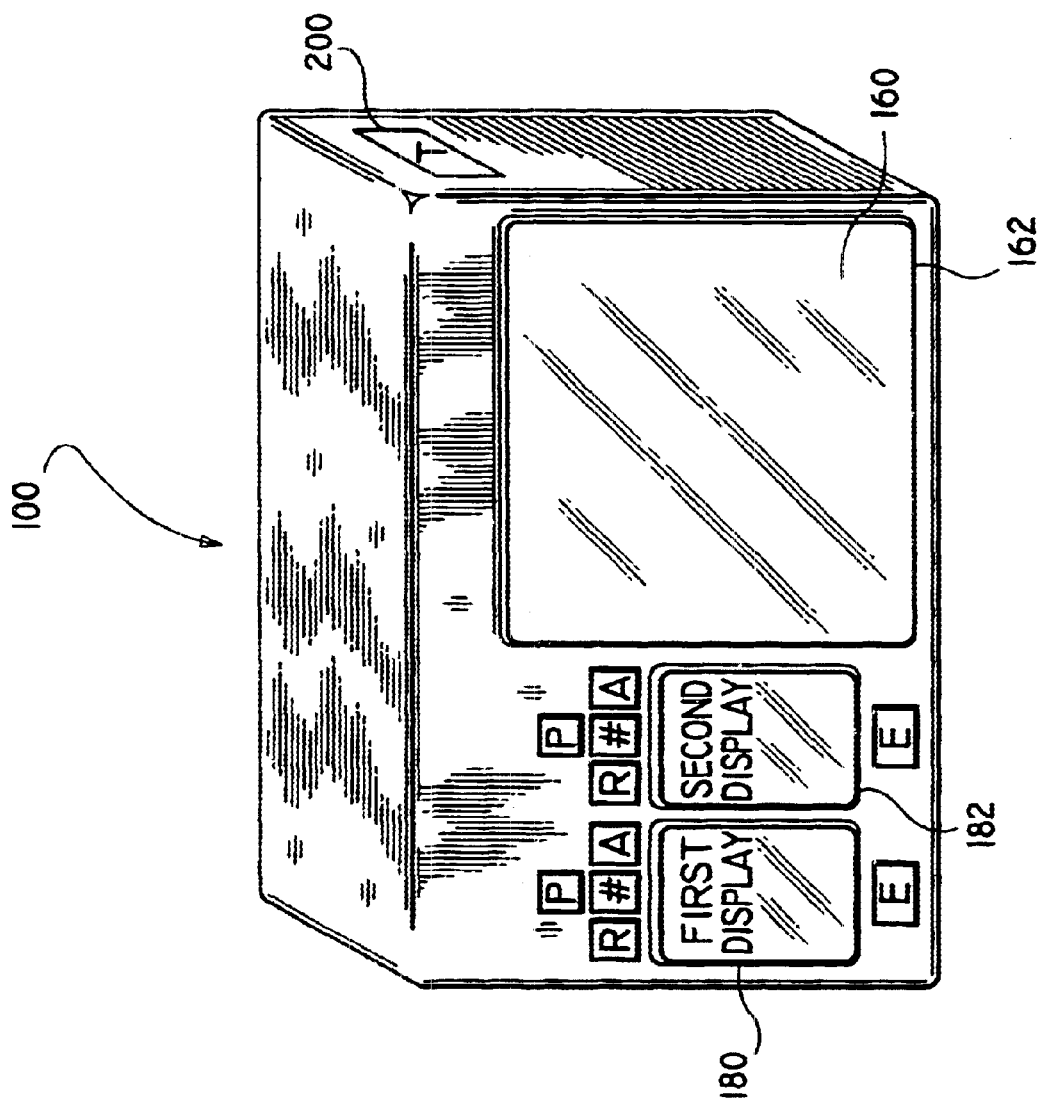
FIG. 3 is a rear view of a digital instant camera according to an embodiment of the invention.
Figure 4A:
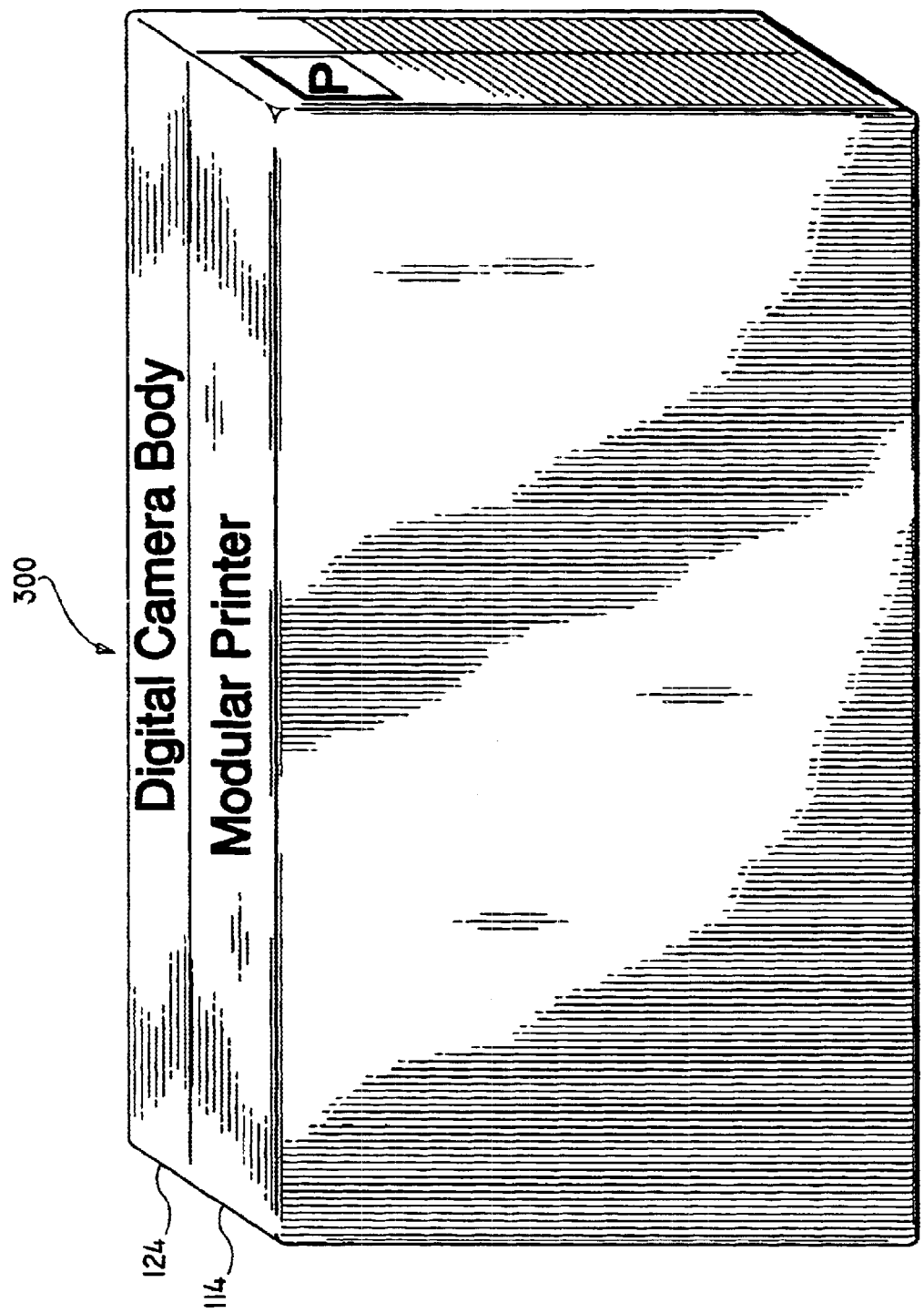
FIG. 4a is a rear view of a digital instant camera including a digital camera body and modular printer according to an embodiment of the invention.
Figure 4B:
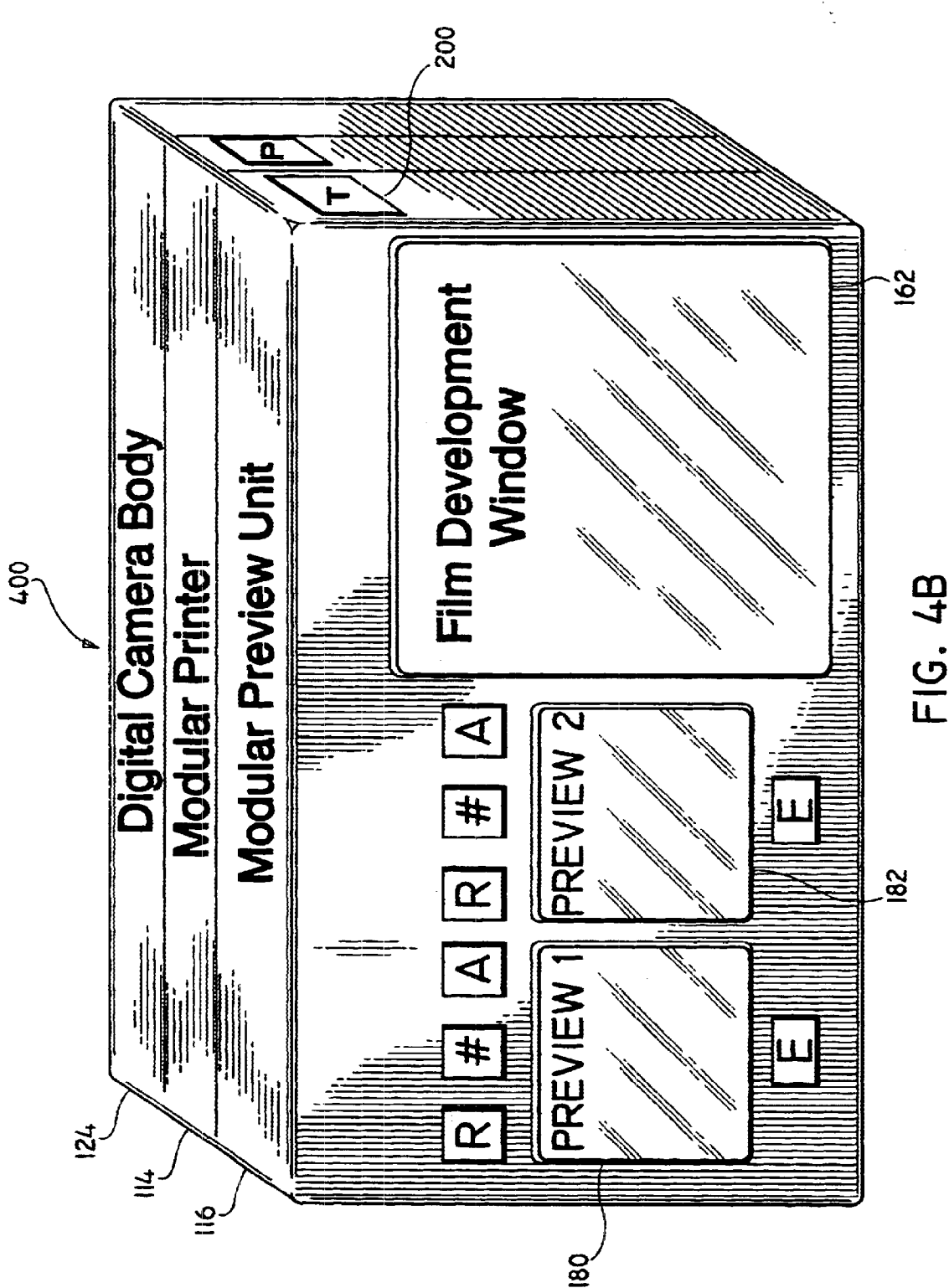
FIG. 4b is a rear view of a digital instant camera including a digital camera body, modular printer, and modular preview unit according to an embodiment of the invention.

The digital instant camera 100 can be a completely integrated unit, as shown in FIG. 3. However, as shown in FIGS. 4(a) and 4(b), preferably the printer 114 is a modular printer and the preview unit 116 is a modular preview unit. Also, it is preferable that the remaining elements of the digital instant camera 100 (imager 110, memory device 112, and controller 118) are contained within a digital camera body 126. Thus, hereinafter, the designation digital camera body 126 is defined to include a digital camera body having, at the least, an imager 110, a memory device 112, and a controller 118. Accordingly, to form an embodiment of the digital instant camera 300, the modular preview unit 116 can be detached from the digital camera body 126 (as shown in FIG. (4a)). To form another embodiment of the digital camera 400, the modular printer 114 can be inserted between the digital camera body 126 and the modular preview unit 116 (as shown in FIG. 4(b)).

There are several different mounting options that can be used to produce the digital instant camera 100 with the three main elements: the digital camera body 126, the printer 114, and the preview unit 116.

Figure 4C:
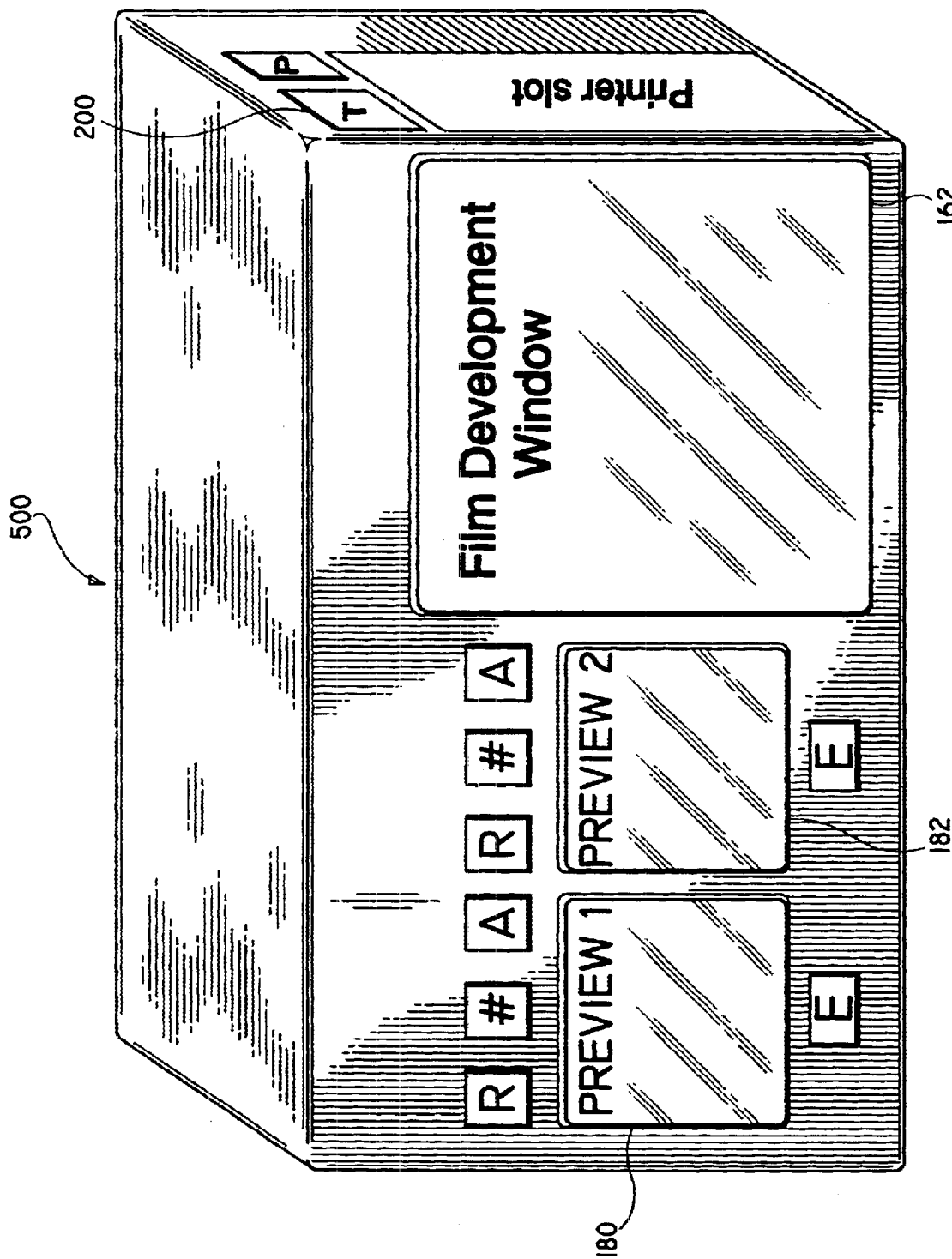
FIG. 4c is a rear view of a digital instant camera according to another embodiment of the invention.

First, the digital camera body 126, preview unit 116, and printer 114 can be connected with physical electronic or optical (e.g., fiber optic) connectors. In this case, the digital instant camera 100 can be constructed according to, at least, any of the following illustrative configurations:

The printer 114 and the preview unit 116 can be attached adjacent to each other and behind the digital camera body 126 (as shown in FIG. 4(b));

The printer 114 and the preview unit 116 can be attached adjacent to each other and beneath (i.e., docked underneath) the digital camera body 126 (not shown);

The printer 114 and the preview unit 116 can be attached adjacent to each other and on any side of the digital camera body 126 (not shown);

In another embodiment, the digital instant camera 500 can be designed as a single unit with a special slot 128 into which the printer 114 can be inserted (as shown in FIG. 4(c)).

Second, the digital camera body 126, the preview unit 116, and the printer 114 can communicate via wireless means such as IRDA (Infrared Data Association) or RF (radio frequency) transceivers. In this case, the digital instant camera 400 can be constructed in any of the following different configurations:

The preview unit 116 can be attached adjacent to the digital camera body 126, on the back, any side, or on the bottom, and the printer 114 can be located within the range of the IRDA transceiver on the digital camera body 126.

The preview unit 116, printer 114 and digital camera body 126 can all be separate yet within range of the others' IRDA or RF transceivers.

Figure 5A:
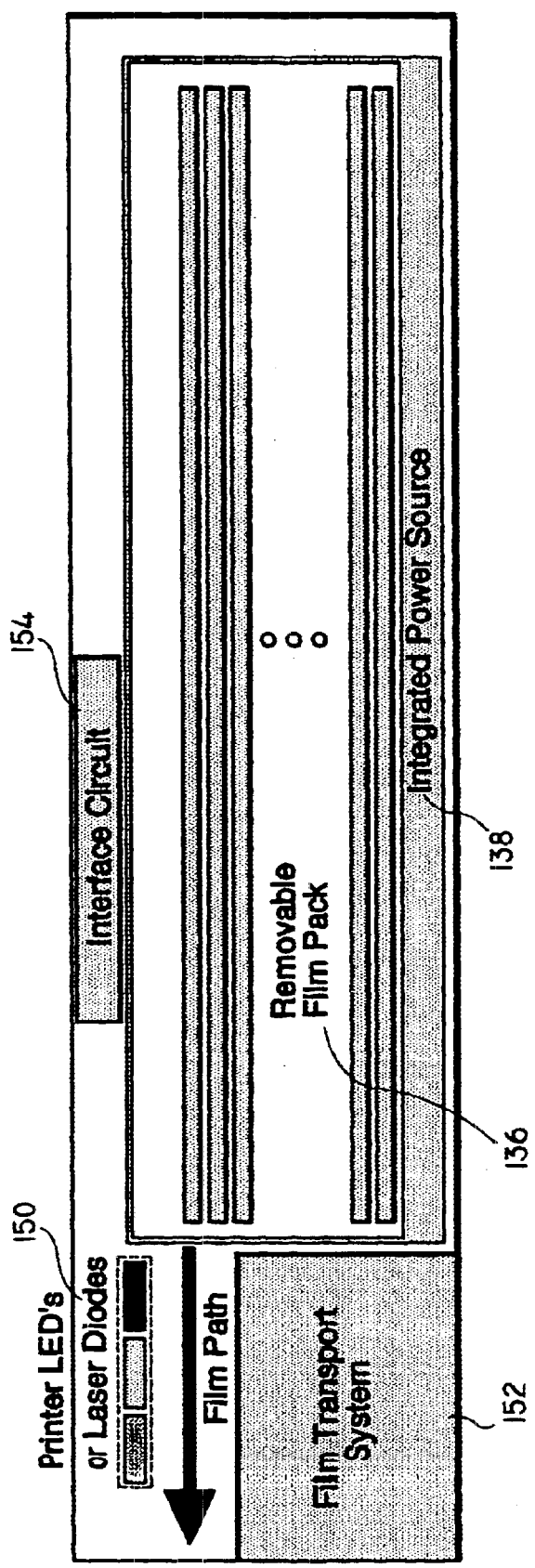
FIG. 5a illustrates an embodiment of the printer of the present invention.

The printer 114 is capable of producing an arbitrary number of pieces of instant prints (e.g., Polaroid film) of any of the digital images stored in the camera, or downloaded from an external computer to the camera to be printed on instant film. A conceptual drawing of an example of such a printer 114 is shown in FIG. 5(a). The printer 114 uses an array of LEDs (light emitting diodes) 150 to print the image on instant photographic film. The printer consists of a movable array of LEDs 150, a film transport system 152, and an interface circuit 154. The LEDs are arranged in three banks (red, green and blue). Optics may be integrated with an LED array if required. For example, 2000 LEDs would provide 500 dpi over a 4-inch-wide instant photograph. The current required for an individual LED is on the order of several nA resulting in a total LED current of 6–20 μA for a 2000-diode array. This is well within the range of today's battery technology and represents a small fraction of the power required by the entire camera/printer combination.

To print the digital image on instant film, the three banks of LEDs are moved uniformly as a unit (such as with a precision micrometer stage, with feedback electronics) across the top of a stationary piece of film. The controller 118 controls the uniformity of the stage motion as well as the exposure of each LED (for example, the exposure-time and the intensity of each LED). After the banks of LEDs have been scanned over the film, the LEDs can be turned off, and the entire LED unit can be reset at its original position. Then the film transport system 152 (such as a cylindrical roller) shown in FIG. 5(a) can move the (now exposed) film to the film development area 160 at the rear of the camera, as shown in FIG. 3. Note that when the film is pulled around the perimeter of the transport roller, the exposed area of the film is now facing outward through the transparent window 162 of the film development area 160. Thus, the user can then watch the film as it develops in real time in the film development area 160. The film development area 160 also serves as a compartment in which the film from each film pack can be stored in bad weather conditions (e.g., if it is raining outside).

The film development area 160 can be located in the printer 114 or in the preview unit 116. The locations of the film development area 160 and film development window 162 vary according to the mounting options of the main elements (the digital camera body 126, printer 114, and preview unit 116) including if the digital instant camera 100 is an integrated unit. Thus, for example, if the printer 114 is located between the digital camera body 126 and the preview unit 116 (as shown in FIG. 4(b)), then the printer 114 may be configured to pass the exposed film into a film development area 160 and corresponding window 162 located in the preview unit 116. This may be accomplished by having aligned passages constructed into both the printer 114 and the preview unit 116 and having the film transport system 152 transport the film through the passages and into the film development area 160 after exposure of the film to the LEDs. Alternatively, the film development window 162 may be omitted.

Figure 5B:
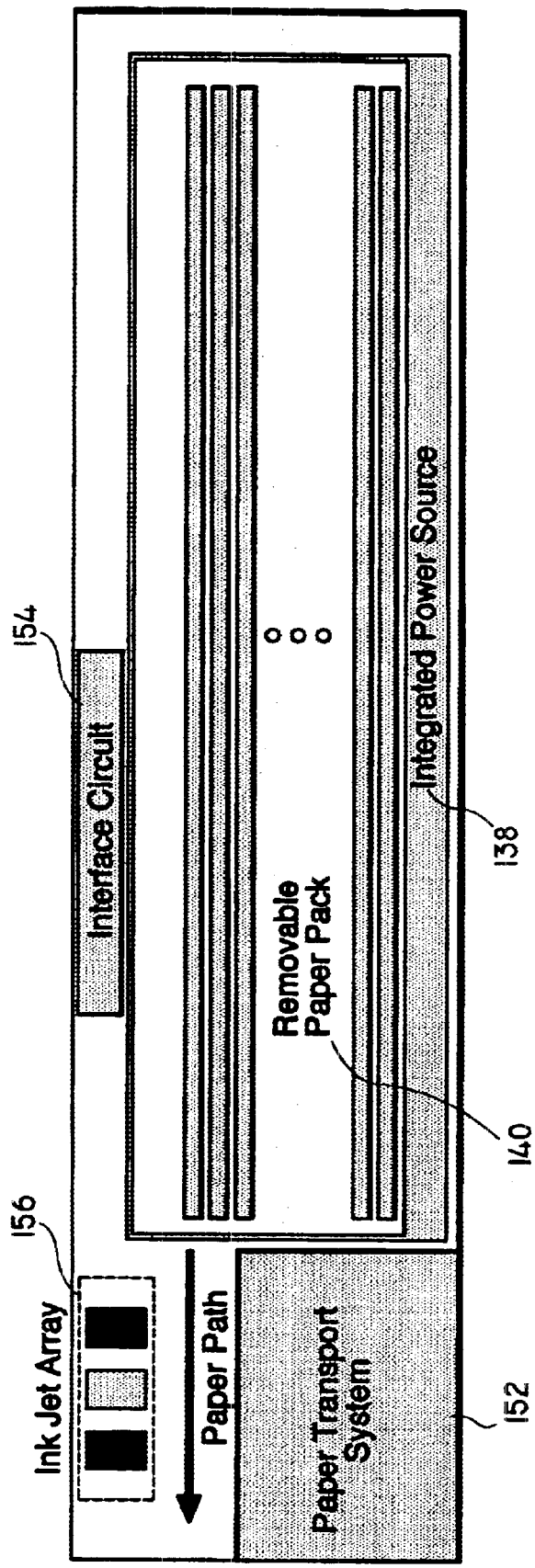
FIG. 5b illustrates another embodiment of the printer of the present invention.

Another embodiment of the invention, which is not shown, provides for the LED array 150 to remain stationary while the film is moved across the array of LEDs 150 by the film transport system 152. Alternatively, the printer 114 can be constructed using ink jet technology, as shown in FIG. 5(b), where ink jets are used to print the image onto paper sheets. In such a case, an ink jet array 156 is substituted for the LED array 150.

The preview unit 116 provides the ability to preview and zoom in on any of a sequence of stored digital images. The preview unit 116 contains one or more displays for previewing a digital image, such as Preview 1 (180) and Preview 2

(182), as shown in FIG. 3. Preview 1 (180) and Preview 2 (182) are electronic displays (e.g., LCD displays) of the digital images stored in the memory device 112. Preview 1 (180) serves as the viewfinder. The preview unit 116 has the ability to zoom and also contains selection options and a capability for image processing, which are discussed below. For example, Preview 2 (182) can be used to observe a zoomed image of Preview 1 (180). The ability to zoom will allow the user to observe the image at full resolution before printing the image on photographic film.

In an embodiment of the invention, Preview 2 (182) can serve as the viewer of a zoomed version of the digital image that is displayed in Preview 1 (180). The region of the image displayed in Preview 1 (180) that is to be shown as a zoomed image in Preview 2 (182) can be specified by the user via a pointing device 200 (e.g., a TrackPoint® selection device), designated (T) in FIG. 3.

Several illustrative ways in which the pointing device can be used to select the region of the image in Preview 1 (180) that is to be displayed in Preview 2 (182) include:

The position of the pointing device 200 in Preview 1 (180) determines the centerpoint of the zoomed image displayed in Preview 2 (182) as the pointing device 200 is moved around by the user in Preview 1 (180). In this case, the size of the image shown in Preview 2 (182) is fixed. The response of the image shown in Preview 2 (182) can be chosen to respond dynamically to changes in the position of the cursor.

The position of the pointing device in Preview 1 (180) determines the lower-left and the upper-right corners of an area whose perimeter is highlighted (or otherwise delineated) and concurrently displayed in Preview 2 (182).

In the case in which the preview unit 116 of the digital instant camera 100 contains only one preview display, a zoomed version of the image may still be obtained. Again, the pointing device 200 can still be used to select the region of the preview display that is displayed in zoom mode. The ways in which this can be accomplished are similar to those mentioned in the previous case:

The position of the pointing device 200 in the preview area determines the centerpoint of the zoomed image displayed in the same preview area as the pointing device 200 is moved around by the user. In this case, the size of the image shown in the preview display is fixed. The portion of the image shown in the preview display tracks the position of the pointing device 200.

The position of the pointing device 200 in the preview area determines the positions of the lower-left and the upper-right corners of an area whose perimeter is marked and which is then displayed for preview.

In another embodiment of the digital instant camera, which is illustrated in FIG. 2, a pointing device interface 202 is provided for interfacing with an external pointing device (not shown).

There are several different ways to select the functions on the preview unit 116. One embodiment of the invention provides for two sets of button-activated selections corresponding to two separate displays in the preview unit 116. For example, in FIG. 2, the two sets of buttons designated R, A, E, P, and #, pertain to the following functions, respectively: reversing through a series of stored digital images (R); advancing through a series of stored digital images (A); erasing an image (E); printing a displayed image or series of images (P); and individually accessing an image in a series of stored images by a descriptive identifier (for example, an image number) (#). To access an image, the user first presses the button designated by the pound symbol (#) to obtain a list of the images on the display. The pointing device 200 can then be used to select an image from the list of images. Since both displays each have these function buttons, two images can be viewed simultaneously in the displays.

Another embodiment of the invention provides for one set of button-activated selections. For this case (not shown), the two sets of selection buttons located above each preview screen (i.e., R, A, E, P, and #) can be combined as one set of buttons on the preview unit 116. A separate selection button or the pointing device 200 can be used to choose which of the two preview screens (i.e., Preview 1 or Preview 2) is active.

A third illustrative embodiment provides for menu-driven selections. For the case in which the preview unit 116 is designed to be compact, robust, and upgradeable, the functions of the buttons described in the two previous sections can be combined on a menu of functions that is displayed on each of the preview screens. The pointing device 200, when clicked on any of the selections displayed on the menu, can be used to choose the appropriate selection. For example, if the pointing device 200 is a TrackPoint® device, then the selection of the desired function can be done by depressing the TrackPoint® at the appropriate (x,y) coordinates that correspond to the position of that function on the menu displayed in either Preview 1 (180) or Preview 2 (182).

The controller 118 and software included in the printer 114 can be designed to permit basic image processing functions on the image displayed in either or both of the displays shown in the areas Preview 1 (180) and Preview 2 (182). In particular, image processing functions may include adjustment of hue, brightness, contrast, and red-eye removal.

The digital instant camera 100 of the present invention may operate in at least the two following illustrated embodiments. The first illustrated embodiment provides for a series of images to be taken and previewed in the preview unit 116. Subsequently, desired images may be selected for printing, with each selected image printed on a single piece of photographic film. The second illustrated embodiment provides for a short video sequence of an event to be taken and previewed in the preview unit 116. Subsequently, desired images may be selected for printing. In this embodiment, a plurality of selected images corresponding to the short video sequence may be printed on a single piece of photographic film. In either of the aforementioned embodiments, enlarged portions of the received images may also be printed.

Another embodiment of the instant camera 100, as shown in FIG. 2, includes an integrated flash device 130 and flash interface 132 for interfacing with an external flash device (not shown). Also, a power source 134 is provided for powering the camera 100, the printer 114, and the flash 130. Other embodiments of the instant camera 100 provide for power being supplied to the instant camera 100 and/or the printer 114 by an instant film cartridge (removable) 136 having an integrated power source 138. For an instant film cartridge 136 that contains N pieces of photographic film, the integrated power source 138 is designed with sufficient capacity to print N instant photographs and support camera operation. After N instant photographs are taken, the cartridge 136 is replaced, which introduces a new integrated power source 138 into the camera to allow additional picture-taking. Alternative arrangements which include rechargeable batteries for the camera electronics/storage and throw-away (film cartridge) batteries for the printer are also feasible. The power arrangements previously described also apply in the case where an ink jet printer is used including in the case in which the ink jet printer has a removable paper pack 140.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digital instant camera, comprising:
   an imager for receiving an image of an object to be photographed, said imager producing a digital signal corresponding to the received image;
   a memory device for storing the signal;
   a printer for printing instant film photographs corresponding to the received images, said printer printing at least one image on a single piece of instant film;
   a preview unit having a plurality of displays for simultaneously displaying different views of an image corresponding to a received or stored image; and
   a controller, in communication with said imager, said memory device, said printer, and said preview unit, for controlling a transfer of the digital signal from said imager to said memory device, from said memory device to said printer, and from said memory device to said preview unit.

2. The digital instant camera of claim 1, wherein the preview unit further comprises a plurality of function buttons for implementing functions corresponding to image selection, image printing and image erasure.

3. The digital instant camera of claim 2, wherein the functions further comprise reversing through a series of stored digital images, advancing through a series of stored digital images, erasing an image, printing a displayed image or sequence of images, and individually accessing an image in a series of stored images by image number.

4. The digital instant camera of claim 1, wherein the preview unit further comprises:
   a pointing device; and
   a graphical user interface, for implementing functions corresponding to image selection, image printing and image erasure.

5. The digital instant camera of claim 4, wherein the functions further comprise reversing through a series of stored digital images, advancing through a series of stored digital images, erasing an image, printing a displayed image or sequence of images, and individually accessing an image in a series of stored images by image number.

6. The digital instant camera of claim 1, wherein said printer is adapted to print a plurality of images on a single piece of instant film, the plurality of images corresponding to a short sequence or set of video frames.

7. The digital instant camera of claim 1, wherein said controller is a microprocessor.

8. The digital instant camera of claim 1, wherein said display of said preview unit is one selected from the group consisting of a liquid crystal display, a field emission display, and a phosphor screen.

9. The digital instant camera of claim 1, wherein said imager is a digital imager.

10. The digital instant camera of claim 9, wherein said digital imager is one selected from the group consisting of a charged-coupled device, a complementary metal-oxide semiconductor, a charge-injection device, and a hybrid of the aforementioned.

11. The digital instant camera of claim 1, further comprising an integrated flash device and a flash interface for interfacing with an external flash device.

12. The digital instant camera of claim 1, further comprising an integrated flash device.

13. The digital instant camera of claim 1, further comprising a flash interface for interfacing with an external flash device.

14. The digital instant camera of claim 1, further comprising a power source for powering said digital instant camera.

15. The digital instant camera of claim 1, further comprising an instant film cartridge having a power source for powering said digital instant camera.

16. The digital instant camera of claim 1, further comprising a power source for powering said imager, said memory device, said preview unit and said controller.

17. The digital instant camera of claim 16, further comprising an instant film cartridge having a power source for powering said printer.

18. The digital instant camera of claim 1, wherein said memory device is one selected from the group consisting of PCMCIA, flash memory, disk, dynamic random access memory, static random access memory, magnetic disk, magnetic tape, and optical memory technologies.

19. The digital instant camera of claim 1, wherein said memory device is removable from said digital instant camera.

20. The digital instant camera of claim 1, further comprising downloading means for downloading stored images from said memory device to an external device.

21. The digital instant camera of claim 20, wherein said downloading means is one selected from the group consisting of wired, wireless, infrared, and fiberoptic technologies.

22. The digital instant camera of claim 1, wherein said printer is a modular printer.

23. The digital instant camera of claim 1, further comprising a film development area having a film development window for viewing the film during development.

24. The digital instant camera of claim 1, wherein said preview unit further comprises a first display and a second display for displaying an image corresponding to the received image, wherein either display is adapted to display an enlarged portion of the received or stored image.

25. The digital instant camera of claim 24, wherein said first display and said second display are selected from the group consisting of a liquid crystal display, a field emission display, and a phosphor screen.

26. The digital instant camera of claim 24, further comprising a pointing device for selecting a region in said first display for zooming in and for enabling the display of the zoomed image in the second display.

27. The digital instant camera of claim 24, wherein said pointing device is one selected from the group consisting of a trackball, a TrackPoint®, a mouse, a button and a joystick.

28. The digital instant camera of claim 24, further comprising a pointing device interface for interfacing with an external pointing device to select a region in at least one display for zooming in and for enabling the display of the zoomed image in either display.

29. The digital instant camera of claim 1, further comprising optics including a lens, a shutter, and aperture, for focusing light onto said imager.

30. A portable digital instant camera, comprising;
   an imager for receiving an image of an object to be photographed, said imager producing a digital signal corresponding to the received image;
   an interface for interfacing with a memory device;
   a printer for printing instant film photographs corresponding to the received images, said printer having ,the capability to print at least one image on a single piece of instant film;

a plurality of displays for simultaneously displaying different views of an image corresponding to a received or stored image; and a controller, in communication with said imager, said memory device, said printer, and said plurality of displays, said controller for controlling a transfer of the digital signal from said imager to said memory device, from said memory device to said printer, and from said memory device to said plurality of displays.

31. A digital instant camera, comprising:

an imager for receiving an image of an object to be photographed, said imager producing a signal corresponding to the received image;

a printer for printing instant film photographs corresponding to the received images, said printer printing at least one image on a single piece of instant film;

a preview unit having a plurality of displays including a first display for displaying an image corresponding to a received or stored image and a second display for displaying a zoomed image corresponding to said image displayed in said first display; and a controller, in communication with said imager, and said printer, for controlling a transfer of the signal from said imager to said printer.

32. The digital instant camera of claim 31, further comprising a preview unit having at least one display for displaying an image corresponding to the received image, said controller also controlling the transfer of the signal from said imager to said preview unit.

33. The digital instant camera of claim 31, further comprising a memory device for storing the signal, said controller also controlling the transfer of the signal from said memory device to said printer.

34. The digital instant camera of claim 32, further comprising a memory device for storing the signal, said controller also controlling the transfer of the signal from said memory device to said printer and from said memory device to said preview unit.

* * * * *